(No Model.)
J. D. SKONE.
MANURE FORK AND SCRAPER.
No. 460,997. Patented Oct. 13, 1891.
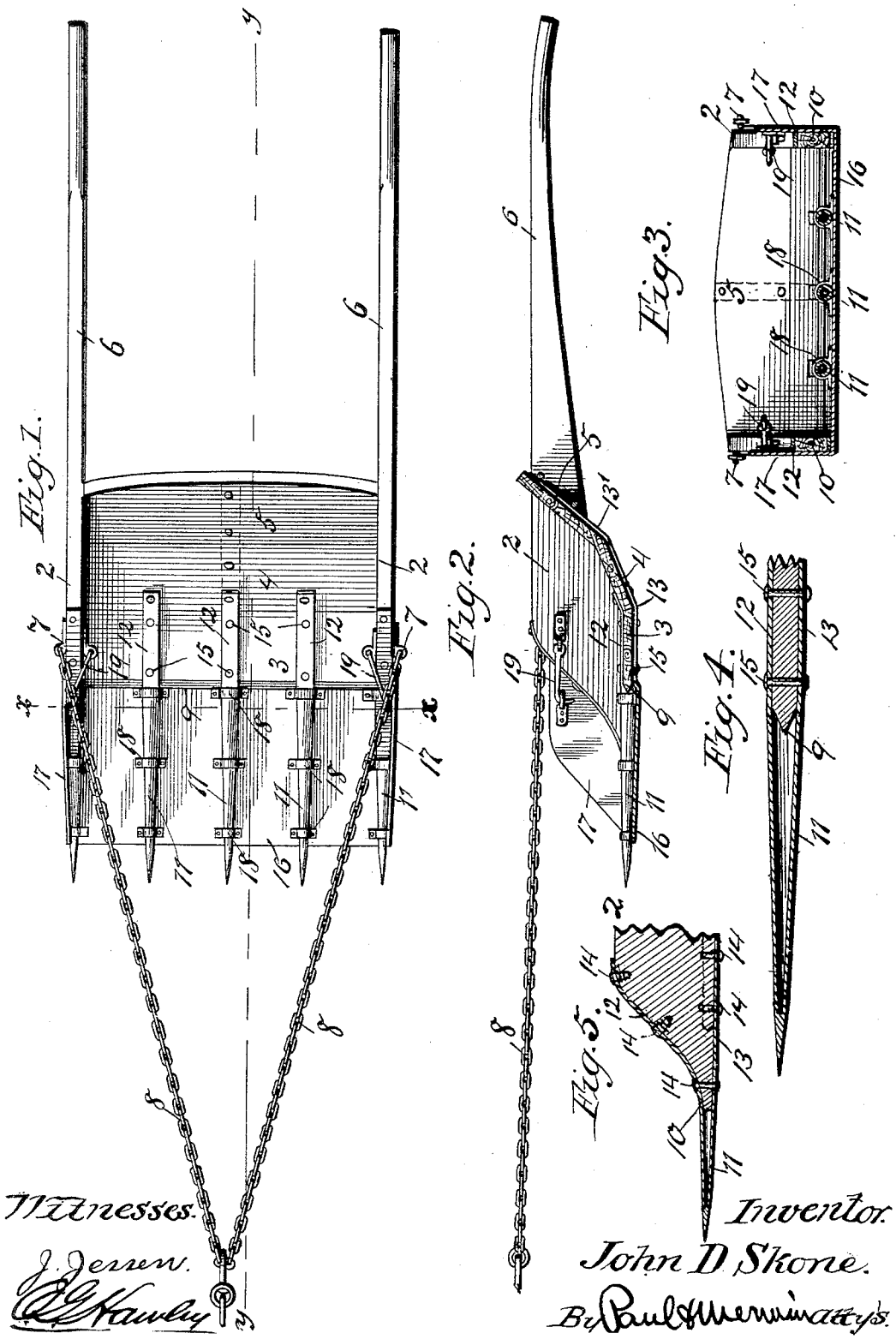
Witnesses
J. Jensen
C. E. Hawley
Inventor
John D. Skone
By Paul H. Merwin attys

UNITED STATES PATENT OFFICE.

JOHN D. SKONE, OF CARVER, MINNESOTA.

MANURE FORK AND SCRAPER.

SPECIFICATION forming part of Letters Patent No. 460,997, dated October 13, 1891.

Application filed February 19, 1891. Serial No. 382,072. (No model.)

*To all whom it may concern:*

Be it known that I, JOHN D. SKONE, of Carver, in the county of Carver and State of Minnesota, have invented a certain Improved Manure Fork and Scraper, of which the following is a full, clear, and exact specification.

My invention relates especially to means for conveying and distributing manure or other light farm-stuff; and the object of the invention is to provide a device adapted to take up and hold either coarse or fine manure.

To this end my invention consists in various details of construction and in combinations hereinafter described, and particularly pointed out in the claims.

My invention will be more readily understood by reference to the accompanying drawings, in which—

Figure 1 is a plan view of the fork and scraper embodying my invention. Fig. 2 is a section thereof on the line $y\ y$. Fig. 3 is a transverse section on the line $x\ x$ in Fig. 1. Fig. 4 is a sectional view of one of the hollow teeth. Fig. 5 is a vertical section of one side of the scraper-box, showing the manner of securing hollow teeth thereto.

As shown in the drawings, the scraper-box is made up of the sides 2, secured together by the cross-planks 3, 4, and 5, forming the bottom and back of the scraper-box. The sides 2 are provided with the long handles 6 and have suitable eyes or hooks 7, adapted to engage the rear ends of the draft-chain 8. This chain is adapted to be hooked onto the whiffletree or evener or to a short section of chain containing a swivel attached thereto. The forward edge 9 of the scraper-box is preferably sharpened, as shown, and sets back a considerable distance behind the lower points or ends of the sides 2, which sides, as shown, are cut down in the form of an ogee curve at an acute angle to the bottom of the scraper-box.

With this simple scraper-box it would be difficult to handle light manure containing straw, &c. I therefore provide the long taper teeth 11, extending forward from the board 3 and in the same plane therewith a distance about equal to the longitudinal depth of the scraper-box, or, if desired, may be of a somewhat greater length. These teeth, as shown in the sectional Figs. 3, 4, and 5 are preferably made hollow for the sake of lightness and at their rear ends are split open and flattened out to form the straps 12 and 13, adapted to be firmly secured on the scraper-box by means of bolts passing through the same. The outside teeth 11 are split up farther than the inner ones, so as to accommodate the narrow ends or points 10 of the sides 2, and the straps 12 and 13 are carried along the edges thereof and secured firmly thereon by the bolts or screws 14. The teeth are thus securely fastened on the side pieces 2 and at the same time said sides protected from wear by the iron straps formed thereon. The middle or inside teeth, preferably three in number, have their straps secured on the top and bottom of the cross-boards by bolts 15, passing through the same and corresponding holes in the straps, being preferably riveted therein and having rounded heads. The middle tooth is provided with the long strap 13, extending back to the top of the board 5 and securing all of the cross-boards firmly together.

In connection with the scraper-box and the teeth I provide the sheet-metal shoe 16, extending across beneath the teeth 11 and provided with the sides 17, conforming to the side 2. This shoe is provided, as shown, with a series of eyes or staples 18, riveted on the upper surface of the plate and adapted to engage the several teeth 11, as shown. The rear row of staples are preferably placed so as to engage the forward edge of the board 3 to prevent the shoe from being pushed back too far. As shown, the ends of the teeth 11 extend some distance beyond the front edge of the shoe. The sides 17 are secured firmly in place by means of the hooks 19, provided either on the scraper or on the shoe and engaging eyes on the other.

For work with fine manure or fine and coarse together my device is used with the shoe just as shown in the drawings. The teeth projecting beyond the shoe catch all of the loose stuff, while the thin edge of the shoe passes under and takes up that which is fine. For use with coarse stuff containing considerable hay and straw the device is used without the shoe. It will be seen that while the device is being drawn along over the ground the handles will be held down, while in dumping the same the ends of the teeth will stick into the ground, whereupon the team, still drawing ahead, pulls the handles over forward, as with ordinary scrapers.

It is obvious that slight modifications in my device would readily suggest themselves to one skilled in the art, and I therefore do not confine myself to the exact construction shown in the drawings.

Having thus described my invention, I claim as new and desire to secure by Letters Patent—

1. The combination, in a device of the class described, of the sides 2, having the handles 6, with the cross-boards 3, the ends of said sides extending beyond the same, and hollow teeth 11, having the straps 12 and 13 secured on the edges of said side pieces 2 by bolts 14 and on the cross-boards or bottom of the scraper-box by the bolts 15, substantially as described.

2. The combination, in a device of the class described, of the sides 2 with the cross-boards, the teeth 11, extending forward in the plane of the board 3, and the sheet-metal shoe having sides and bottom adapted to be secured on the under side of said teeth, substantially as described.

3. The combination of the sides 2 and the bottom of the scraper-box with the teeth 11, the sheet-metal shoe having sides 17, adapted to be secured on the sides 2, and the eyes or staples 18 on the bottom 16 of said shoe, adapted to engage the teeth 11, substantially as described.

4. The combination, with the sides 2 and cross-boards 3, 4, and 5, of the hollow teeth 11, having the straps 12 and 13 secured on said sides and cross-boards, the shoe having the bottom 16 and the sides 17, the eyes 18, adapted to engage said teeth, hooks adapted to secure said sides 17 on said sides 2, the ends of said teeth 11 extending slightly beyond the forward edge of the shoe, substantially as and for the purpose specified.

In testimony whereof I have set my hand this 11th day of February, 1891.

JOHN D. SKONE.

In presence of—
   WM. A. GRIFFIN,
   GEORGE KNOBLAUCH.